United States Patent [19]
Cody et al.

[11] Patent Number: 4,959,337
[45] Date of Patent: Sep. 25, 1990

[54] WAX ISOMERIZATION CATALYST AND METHOD FOR ITS PRODUCTION

[75] Inventors: Ian A. Cody, Clearwater, Canada; Hamner, deceased Glen P., late of Baton Rouge, La., by Annabelle Hamner, executor; Willard H. Sawyer, Baton Rouge, La.; Willard H. Sawyer, Baton Rouge, La.; Davis S. Mark, Baton Rouge, La.

[73] Assignee: Exxon Research and Engineering Company, Florham Park, N.J.

[21] Appl. No.: 283,709

[22] Filed: Dec. 13, 1988

Related U.S. Application Data

[63] Continuation-in-part of Ser. No. 134,795, Dec. 18, 1987, abandoned.

[51] Int. Cl.$^5$ .................. B01J 21/04; B01J 27/12; B01J 27/13
[52] U.S. Cl. ................... 502/230; 502/224; 502/229
[58] Field of Search ............ 502/224, 229, 230

[56] References Cited

U.S. PATENT DOCUMENTS

| | | | |
|---|---|---|---|
| 2,668,790 | 2/1954 | Good et al. | 196/50 |
| 2,668,866 | 2/1954 | Good et al. | 260/683.5 |
| 2,838,444 | 6/1958 | Teter et al. | 196/50 |
| 3,078,323 | 2/1963 | Kline et al. | 260/683.65 |
| 3,121,696 | 2/1964 | Hoekstra | 502/230 |
| 3,123,573 | 3/1964 | Carr | 252/442 |
| 3,125,511 | 3/1964 | Tupman et al. | 208/264 |
| 3,206,525 | 9/1965 | Michaels et al. | 260/683.66 |
| 3,268,439 | 8/1966 | Tupman et al. | 208/112 |

(List continued on next page.)

FOREIGN PATENT DOCUMENTS

| | | |
|---|---|---|
| 700237 | 12/1964 | Canada . |
| 0153782 | 9/1985 | European Pat. Off. . |
| 227888 | 10/1985 | German Democratic Rep. . |
| 823010 | 11/1959 | United Kingdom . |
| 848198 | 9/1960 | United Kingdom . |
| 848198 | 9/1960 | United Kingdom . |
| 1065205 | 4/1967 | United Kingdom . |
| 1342499 | 1/1974 | United Kingdom . |
| 1342500 | 1/1974 | United Kingdom . |
| 1440230 | 6/1976 | United Kingdom . |
| 1493928 | 11/1977 | United Kingdom . |

*Primary Examiner*—W. J. Shine
*Attorney, Agent, or Firm*—Joseph J. Allocca

[57] ABSTRACT

A wax isomerization catalyst is described which comprises a Group VIII hydrogenation metal component on fluorided alumina or material containing alumina which catalyst possesses a surface nitrogen content N/Al ratio of about 0.01 or less determined by X-ray photoelectron spectroscopy, a bulk fluorine content of between about 2 to 10 wt %, a surface fluorine content defined as the amount of fluorine in a layer extending from the outer surface to a depth of about 1/100 of an inch of less than about 3 wt % provided that the surface fluoride concentration is less than the bulk fluoride concentration and an aluminum fluoride hydroxide hydrate peak height of 60 or less determined as the relative amount of hydrate represented by a peak in the X-ray diffraction pattern at $2\theta = 5.66$ Å when a hydrate level of 100 corresponds to the XRD peak height exhibited by a standard material. Also described is a method for producing a slack wax isomerization catalyst said method comprising depositing a Group VIII hydrogenation metal on alumina or material containing alumina extrudate, calcining said metal loaded extrudate, fluoriding said material using an aqueous fluorine source solution having a pH of 3.5 to 4.5 to a bulk fluorine level of about 8 wt % or less followed by heating in an air oxygen containing atmosphere or inert gas from ambient to 350° to 450° C. within 3 hours and holding at the final temperature, if necessary, for a time sufficient to reduce the hydrate and nitrogen contents to the aforesaid levels. Alternatively the catalyst can be made using a fluorine solution of pH less than 3.5 to a bulk fluorine level of about 10 wt % or less followed by heating in air or an oxygen containing atmosphere, or inert atmosphere at about 350° to 450° C.

20 Claims, 9 Drawing Sheets

U.S. PATENT DOCUMENTS

| | | | |
|---|---|---|---|
| 3,308,052 | 3/1967 | Ireland et al. | 208/27 |
| 3,365,390 | 1/1968 | Egan et al. | 208/60 |
| 3,684,695 | 8/1972 | Neel et al. | 208/110 |
| 3,711,399 | 1/1973 | Estes et al. | 208/112 |
| 3,717,586 | 2/1973 | Suggitt et al. | 502/230 X |
| 3,794,580 | 2/1974 | Ladeur | 208/110 |
| 3,830,723 | 8/1974 | Ladeur et al. | 208/108 |
| 3,864,425 | 2/1975 | Gardner | 260/683.68 |
| 3,915,843 | 10/1975 | Franck et al. | 208/112 |
| 3,963,601 | 6/1976 | Hilfman | 208/111 |
| 3,976,560 | 8/1976 | Erickson | 208/138 |
| 4,263,127 | 4/1981 | Rausch et al. | 208/58 |
| 4,427,791 | 1/1984 | Miale et al. | 502/203 |
| 4,472,529 | 9/1984 | Johnson | 502/228 |
| 4,588,701 | 5/1986 | Chiang et al. | 502/65 |

FIG. I

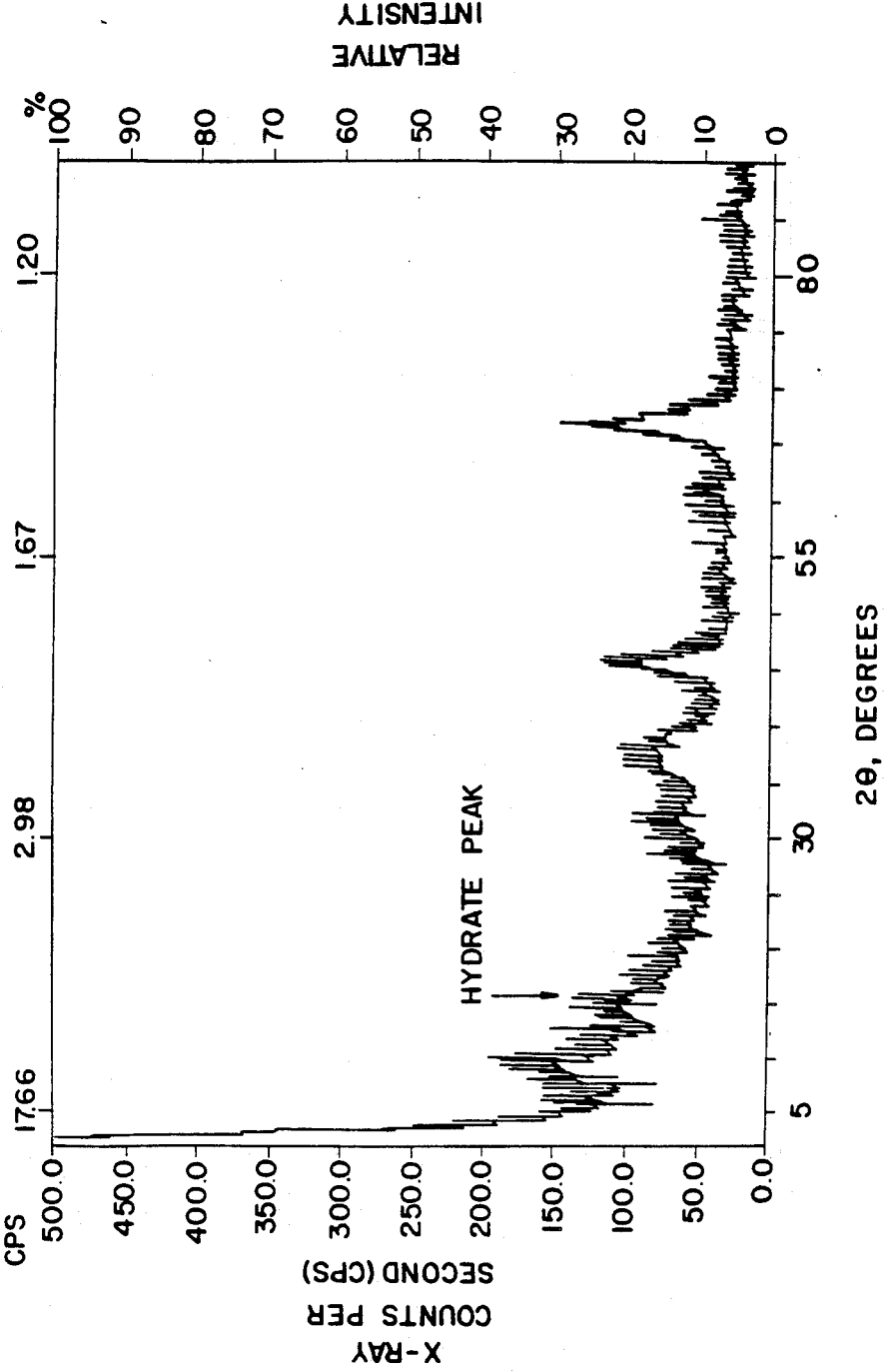
FIG. 6D (CATALYST 3)

WAX ISOMERIZATION CATALYST AND METHOD FOR ITS PRODUCTION

CROSS REFERENCE TO COPENDING APPLICATION

This is a continuation-in-part application of copending U.S. Ser. No. 134,795, filed Dec. 18, 1987.

Background of the Invention

1. Field of the Invention

This invention is directed to a particular wax isomerization catalyst which displays both high activity and high selectivity in the conversion of said waxes to lube oil base stock or blending stock. It is further directed to particular procedures for the production of isomerization catalysts.

Description of the Invention

The present invention is directed to a wax isomerization catalyst comprising a hydrogenation metal component on a fluorided alumina or support material containing alumina, preferably alumina or a support material consisting predominantly (i.e. >50%) of alumina, which catalyst in its as introduced to waxy feed form is characterized by possessing an aluminum fluoride hydroxide hydrate peak height of about 60 and less, preferably between 10 to 60 determined as the relative amount of hydrate represented by a peak in the X-ray diffraction (XRD) pattern at $2\phi = 5.66$Å wherein a hydrate level of 100 corresponds to the XRD peak height exhibited by a "standard reference" material (the subject of U.S. Ser. No. 134,796 filed Dec. 18, 1987 in the names of Hamner and Sawyer now, U.S. Ser. No. filed even date herewith) made by treatment of a standard reforming grade Pt/$\gamma$Al$_2$O$_3$ material containing 0.6 wt% Pt on 150 m$^2$/g surface area $\gamma$ alumina using an aqueous solution containing a high concentration of HF, i.e. 10 wt% and greater, preferably 10 to 15 wt% HF to a fluoride content of about 7.2 wt% F and dried at 150° C. for 16 hrs. This "standard reference" material is exemplified by Catalyst 8 (unactivated) described in the text below.

The catalyst of the present invention is also characterized as possessing a surface nitrogen content of about 0.01 N/Al or less, preferably about 0.007 N/Al or less, most preferably about 0.004 N/Al or less as determined by X-ray photoelectron spectroscopy (XPS). The hydrogenating metal component is selected from Group VIII and mixtures thereof, preferably noble Group VIII metal, e.g. platinum. The hydrogenating metal component is present at a level between 0.1 to 5 wt%, most preferably 0.2 to 0.6 wt%. Bulk fluorine loading between 2 to 10 wt%, preferably between about 5 to 8 wt% on a dry basis while the surface fluorine content is defined as the amount of fluorine present in a layer extending from the surface of the particle (e.g. 1/16 inch extrudate) to a depth of about 1/100 inch, is less than about 3 wt%, preferably less than about 1 wt%, most preferably less than about 0.5 wt% fluorine in that zone provided that the surface fluoride concentration is less than the bulk concentration fluoride. Catalyst possessing the above recited characteristics exhibit high selectivity and high time averaged activity for wax hydroisomerization. This is surprising since usually these two performance characteristics are not found in the same material at the same time; high activity usually is accompanied by lower selectivity while high selectivity is usually accompanied by low activity.

For the purposes of the present application a catalyst is deemed to exhibit high activity and high selectivity if when used to isomerize a hydrotreated slack wax derived from a 600N oil containing about 20% oil the catalyst exhibits an activity of at least 1 preferably 2 or greater after 300 hrs on stream and a selectivity to 370° C+ dewaxed oil (wt% on feed) of about 50% and greater. Activity is defined as the rate constant for the first order disappearance of wax at a temperature of 330° C. and where reaction pressure is 1000 psi H2 and gas rate is 5000 SCF/bbl and assuming an energy of activation of 65Kcal/mole. "Dewaxed oil" is defined as the oil yield using the ASTM D3235 oil content procedure unless stated otherwise.

The present invention is also directed to a process of making slack wax isomerization catalysts, utilizing either solutions of pH 3.5 to 4.5 for fluoriding the noble metal on alumina material or solutions of pH less than 3.5. When using solutions of pH 3.5 to 4.5, the resulting fluorided material requires only short activation and drying procedures before being employed as a catalyst. Conversely, when using solutions of pH less than 3.5, the resulting fluorided material may employ much longer activation or drying procedures.

In either case the preparation of a slack wax isomerization catalyst involves depositing the hydrogenation metal component on alumina or a support material containing alumina, preferably consisting predominantly (i.e. >50%) of alumina, calcining said metal loaded support, and fluoriding said combination using a fluoriding source.

Catalysts fluorided using solutions of pH of between 3.5 and 4.5, are fluorided to a bulk fluorine level of about 8 wt% or less (i.e 2 to 8 wt%) preferably 7 wt% or less, followed by heating in a thin bed or rotary kiln to ensure thorough even heating in an oxygen containing atmosphere or inert gas. The heating rate should be sufficiently rapid to ensure removal of nitrogen and a low level of fluorine at the surface of the catalyst. The catalyst should be heated to a final temperature of 350° to 450° C., preferably 375° to 400° C. and held at that temperature, if necessary, for a time sufficient to reduce the hydrate and nitrogen contents to the aforesaid levels.

Fluoriding above about pH 4.5 should be avoided because it is not possible to achieve the desired low fluorine levels at the catalyst surface Alternatively catalysts can be made using a fluorine source solution having a low pH of less than 3.5 e.g. aqueous HF, said fluoriding using this low pH solution technique being to a bulk fluorine level of about 10 wt% or less,(i.e. 2 to 10 wt%) preferably about 8 wt% or less, followed by heating in a thin bed or rotary kiln to ensure thorough even heating in air or oxygen containing atmosphere or hydrogen or inert gas to a temperature of 350° to 450° C., preferably 375° to 425° C. The material can be held at this temperature for 1 to 5 hours if desired.

If this low pH prepared catalyst is first charged to a unit without calcination, the catalyst must be held at the final activation temperature for longer than 5 hours, preferably longer than 10 hours and preferably at temperatures of 400° to 450° C.

Following heating, catalysts prepared by either procedure can be used as such with temperature and pressure being brought up to operating conditions after which waxy feed is introduced. It has been found that the catalyst made employing a fluorine source solution with pH 3.5 to 4.5 is preferably activated in hydrogen using a short activation time period e.g. from 2 to 24 hrs, preferably 2 to 10 hours. Long activation times (in excess of 24 hrs) have been found to be detrimental to catalyst performance, (see catalyst 7). In contrast, when dealing with a catalyst made using the low pH solution (i.e. less than pH 3.5) technique, the activating step may be conducted in a hydrogen or hydrogen containing atmosphere at a temperature of 350 to 500° C. for from 1 to 48 hrs. or more.

In fact, if low pH (i.e. <3.5 pH) prepared catalysts are not heated first then it is preferred that they be subsequently activated at more severe conditions, i.e. for longer times and/or higher temperatures. On the other hand, if they are heated first then moderate activation procedures similar to those employed with catalysts made from the higher pH (i.e. 3.5 to 4.5 pH) solution treatment will suffice.

DESCRIPTION OF SCANNING ELECTRON MICROGRAPH (SEM)

Figure 1:
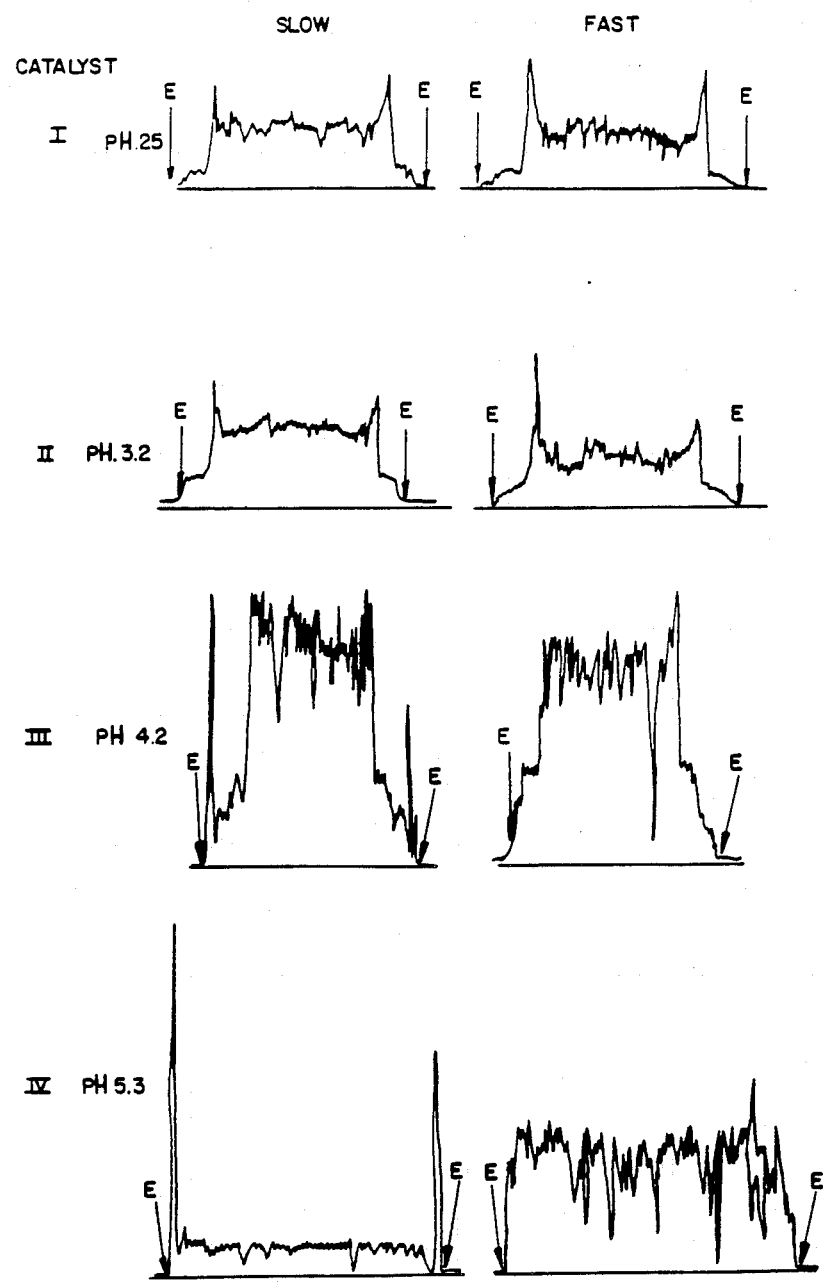
FIG. 1 presents election microprobe analysis of catalysts I to IV of Example 1 and shows the effect of and relationship between the pH of the fluoriding media and of the calcination conditions on the fluorine distribution in the catalysts.

In the figures showing electron microprobe cross-sections of F distribution there is, in some cases, a concentration gradient at the edge of the particle which is an artifact resulting from the relatively large beam width needed to get an acceptable signal response. Poor response and poor beam characteristics result in the signal being offset in the direction of the beam motion. Note therefore that the edge concentration is shown at some point beyond where the signal first begins to rise.

DISCLOSURE OF THE INVENTION

The present invention is directed to a wax isomerization catalyst comprising a hydrogenation metal component on a fluorided alumina or support material containing alumina, preferably alumina or a support material consisting predominantly of (i.e. >50%) alumina, most preferably alumina which catalyst in its as introduced to waxy feed form is characterized by possessing an aluminum fluoride hydroxide hydrate peak height (hereinafter "hydrate content") of 60 and less, preferably between 10 to 60 determined as the relative amount of hydrate represented by a peak in the X-ray diffraction (XRD) pattern at $2\theta = 5.66$ Å wherein a hydrate level of 100 corresponds to the XRD peak height exhibited by a "standard reference" material made by treatment of a standard reforming grade { $Pt/Al_2O_3$ material containing 0.6 wt% Pt on 150 $m^2/g$ surface area alumina using an aqueous solution containing a high concentration of HF, i.e. 10 wt% and greater, preferably 10 to 15 wt% HF to a fluoride content of about 7.2 wt% F and dried at 150° C. for 16 hrs. This "standard reference" material is exemplified by Catalyst 8 (unactivated) described in the text below.

The catalyst of the present invention is also characterized as possessing a surface nitrogen content of 0.01 N/Al or less, preferably 0.007 N/Al or less, most preferably 0.004 N/Al or less, as determined by X-ray photoelectron spectroscopy (XPS). The hydrogenating metal component is selected from Group VIII and mixtures thereof, preferably noble Group VIII metal, e.g. platinum. The hydrogenating metal component is present at a level between 0.1 to 5 wt%, preferably 0.1 to 1 wt%, most preferably 0.2 to 0.6 wt%.

Bulk fluorine content of the catalyst is between about 2 to 10 wt%, preferably between about 5 to 8 wt%. In addition the surface fluorine content measured as the amount of fluorine in the layer of the catalyst particle extending from the surface to about 1/100 inch below the surface is on the order of less than about 3 wt%, preferably less than about 1 wt%, preferably less than about 0.5 wt% fluorine provided that the surface fluoride concentration is less than the bulk concentration. Catalysts possessing the above described physical characteristics have been found to possess very high activity while at the same time exhibiting very high selectivity. This is surprising since usually these two performance characteristics are mutually exclusive, that is high activity usually has associated with it relatively low selectivity while high selectivity is usually accompanied by lower activity.

The fluoride content of the catalyst can be determined in a number of ways.

One technique analyzes the fluorided catalysts using oxygen combustion methodology which is well established in the literature. Approximately 8-10 mgs of sample is mixed with 0.1 g benzoic acid and 1.2 gms of mineral oil in a stainless steel combustion capsule which is mounted in a 300 mL. Parr oxygen combustion bomb. The "sample" is purged of air and subsequently combusted under 30 Atms of pure oxygen. Combustion products are collected in 5 mL. of deionized water. Once the reaction has gone to completion (about 15 minutes), the absorbing solution is quantitatively transferred and made to fixed volume.

Fluoride concentration of the sample is determined by ion chromatography analysis of the combustion product solution. Calibration curves are prepared by combusting several concentrations of ethanolic KF standards (in the same manner as the sample) to obtain a 0-10 ppm calibration range. Fluoride concentration of the catalyst is calculated on an ignition-loss-free-basis by comparison of the sample solution response to that of the calibration curve. Ignition loss is determined on a separate sample heated to 800 degrees F. for at least 2 hours. Ion chromatographic analysis uses standard anion conditions.

Another procedure employs the use of fluoride distillation with a titrimetric finish. Fluorides are converted into fluorosilicic acid ($H_2SiF_6$) by reaction with quartz in phosphoric acid medium, and distilled as such using super heated steam. This is the Willard-Winter-Tananaev distillation. It should be noted that the use of super heated, dry (rather than wet) steam is crucial in obtaining accurate results. Using a wet steam generator yielded results 10–20% lower. The collected fluorosilicic acid is titrated with standardized sodium hydroxide solution. A correction has to be made for the phosphoric acid which is also transferred by the steam. Fluoride data are reported on an ignition-loss-free-basis after determination of ignition loss on a sample heated to 400 degree C for 1 hour.

The present invention is also directed to a wax isomerization catalyst prepared by a process involving depositing the hydrogenation metal component on the refractory metal oxide support in powder, extrudate or pellet form, heating said metal loaded support in air or an oxygen containing atmosphere, and fluoriding said combination, using a fluorine source solution of pH 3.5 to 4.5, to bulk fluorine level of about 8 wt% or less, followed by heating rapidly (i.e. 3 hours or less) in a thin bed or rotary kiln in air, oxygen or an inert atmosphere to a temperature between 350° to 450° C., preferably 375° C. to 400° C. and holding, if necessary, at the final temperature for a time sufficient to reduce the hydrate and nitrogen content to the aforesaid levels. Alternatively the catalyst can be made using a fluorine source solution having a low pH of less than 3.5, fluoriding being conducted to produce a bulk fluorine content of about 10 or less using e.g. HF followed by heating in a thin bed or rotary kiln in air, oxygen or an inert atmosphere to a temperature of 350° to 450° C., preferably 375°–425° C. and holding for about 1–5 hours. If the catalyst is first charged to a unit, the dense bed charge of catalyst must be held at the final activation temperature for longer than 5 hours, preferably longer than 10 hours and preferably at temperatures of 400° C. to 450° C.

After performing the fluoride treatment, catalysts made using solutions pH 3.5 to 4.5 must be heated to drive off nitrogen. It has been discovered that the rate of heat-up has to be rapid in order to preserve the desired low levels of fluorine at the surface of the catalyst. It is preferred that these catalysts be heated in air up to 350° to 450° C., preferably 375° to 425° C. before charging to a unit. The time taken to raise the temperature of the catalyst from ambient to the aforementioned final temperatures should preferably be no longer than about 3 hrs, more preferably no longer than about 1 hour. As mentioned previously, the catalyst may be held at the final temperature for from 1 to 5 hours or as long as is necessary to achieve the target hydrate level and nitrogen content.

It has been found that the use of a rotary kiln furnace achieves the desired N/Al in a shorter time or at a lower temperature than a muffle furnace. Catalysts made using solutions of pH less than 3.5 are not sensitive to the rate of heat-up. Low fluorine levels at the catalyst surface are retained over a wide range of heat-up conditions. Also these catalysts may be charged to a unit without prior heating. An important proviso with these catalysts is that they be held at the final temperature long enough to achieve the desired hydrate level and nitrogen content.

In either case, care must be taken to avoid heating to temperatures in excess of 500° C. above which significant metal agglomeration occurs rendering the catalyst less effective for wax isomerization.

Following the aforesaid heating step, the catalyst can be used as such with temperature and pressure being adjusted to operating conditions after which hydrogen and waxy feed are introduced. Alternatively following the aforesaid heating step the catalysts made using solutions of pH 3.5 to 4.5 can be activated in hydrogen or hydrogen containing atmosphere, (i.e. pure $H_2$ or plant $H_2$ having 60–70 vol% $H_2$) by heating to 350° to 450° C. using a short activation time period, from 2 to 24 hrs being sufficient. Short activation periods are preferred as excessively long activation times (in excess of 24 hrs) have been found to be detrimental to catalyst performance (See Catalyst 7).

The isomerization catalyst utilizes a hydrogenation metal component. This metal component is selected from Group VIII metals, and mixtures thereof, most preferably the noble Group VIII metals, e.g. Pt. This hydrogenation metal component is deposited on the refractory metal oxide support by any convenient method, such as by solution exchange or by incipient wetness etc. Suitable sources of the hydrogenation metal component include chloroplatinic acid, fluoroplatinic acid etc. The preferred technique involves first depositing the hydrogenation metal on the support followed by calcination, halogenation, and a final drying-/heating step as previously described.

From 0.1 to 5.0 wt% hydrogenation metal component is deposited on said support, preferably from 0.1 to 1.0 wt% metal, most preferably 0.1 to 0.6 wt% metal, on said support.

After metal(s) are deposited, the material is dried at about 120° C. to 150° C. and the metal loaded support is calcined at between about 350° to 500° C., preferably 450°–500° C. for about 1 to 5 hrs, preferably about 1 to 3 hrs.

The refractory metal oxide support is preferably alumina, most preferably gamma or eta alumina. Typically useful aluminas have surface areas in range 10 to 250 $m^2/g$, preferably 100 to 250 $m^2/g$.

The support is preferably in the form of extrudates, which are preferably at least about 1/32 inch across the longest cross sectional dimension. Such extrudates can take the form of tri-lobes, rings, etc., preferably about 1/32 to ¼ inch cylinders, most preferably 1/16 to ⅛ inch cylinders.

Following deposition of the hydrogenation metal on the refractory metal oxide support and calcination the catalyst is fluorided using an aqueous solution with pH less than 3.5 to a bulk fluorine content of about 10 wt% or less. Alternatively catalysts are made by fluoriding at a pH of 3.5 to 4.5 to a bulk fluorine content of about 8 wt% or less. Typically, the desired pH range for either procedure is achieved by mixing solutions of HF (pH approximately 2.5) with $NH_4F$ (pH approximately 7.5).

Contacting the metal loaded support with the fluorine solution may be conducted under any suitable conditions of temperature and contacting time. Typically contacting is performed under ambient temperature, but it could be conducted at up to the boiling point of the solution. Contacting can be effected simply by soaking the metal loaded extrudates in the solution or even by pouring the solution over the extrudate. The preferred mode of contacting is by soaking or incipient wetness, for from 1 to 20 hours, preferably 2 to 16 hours, actual contacting time depending on the ease with which the fluorine becomes incorporated into the support to the desired level.

Following the introduction of fluorine into the metal loaded support, the resulting composite may be washed to remove excess fluorine material, and then typically dried as described above.

Following deposition of the metal and fluorine on the refractory metal oxide support and drying, the catalyst is heated in air, an oxygen containing atmosphere or an inert atmosphere to achieve the previously recited hydrate level and nitrogen content.

Following heating the catalyst as finally prepared is charged to the isomerization reactor and brought quickly up to operating conditions. Alternatively, following heating the catalyst can be activated in hydrogen or hydrogen containing atmosphere (e.g. pure $H_2$ or plant $H_2$ which contains 60–70 vol% $H_2$). When activating the catalyst made by employing the high pH 3.5–4.5 technique, care must be taken to employ short total activation times, from 1 to 24 hours preferably 2 to 10 hours being sufficient. A catalyst made using the pH less than 3.5 technique are not as susceptible to damage during activation so temperature of 350° C. to 500° C. may be used for from 1 to 48 hours or longer. A typical activation profile shows a period of 2 hours to go from room temperature to 100° C. with the catalyst being held at 100 C for 0 to 2 hours then the temperature is raised from 100 to about 350° to 450° C. over a period of 1 to 3 hours with a hold at the final temperature of from 1–4 hours. Alternatively the catalyst can be hydrogen activated by heating from room temperature to the final temperature of 350–450° C. over a period of 1–7 hours with a hold at the final temperature of 0–4 hours.

Very short activation times are sufficient, and it is even possible to dispense with a separate activation procedure entirely (provided the catalyst has been first heated in air). In these instances the heated catalyst may be charged to the reactor and quickly being brought up to start of run conditions in pure or plant hydrogen (about 60–70% $H_2$) before introduction of wax feed.

Catalysts prepared by the above technique have a surface nitrogen content as determined by, for example, X-ray photo electron spectroscopy (XPS) of between 0.01 N/Al or less (by XPS), preferably 0.007 N/Al or less, most preferably about 0.004 N/Al or less (by XPS). XPS is a surface analysis technique that typically probes the top 20 Å layer of a sample. (High energy X-rays displace some electrons of elements in the sample, producing electrons of characteristic kinetic energy.) This analysis technique performed on a powdered sample of catalyst is employed because it is a more sensitive measure of the impact of N on catalyst performance than that provided from classical bulk N measurement methods which become unreliable for low nitrogen concentration levels. To correlate XPS measurements with bulk nitrogen measurement, it has been determined that an N/Al ratio by XPS of about 0.008 corresponds to a bulk nitrogen content of about 0.2 wt% while an N/Al ratio by XPS of about 0.001 corresponds to about 0.025 wt% nitrogen determined by bulk measurement methods. Bulk fluorine content is between 2 to 10 wt%, preferably about 5 to 8 wt% but surface fluorine content measured as the amount of fluorine in the layer of the catalyst particle (e.g. 16 inch extrudate) extending from the surface to a depth of about 1/100 of an inch is on the order of less than 3 wt%, preferably less than about 1 wt%, most preferably less than about 0.5 wt% fluorine in that zone provided that the surface fluoride concentration is less than the bulk concentration. These catalysts exhibit both high selectivity and high time averaged activity.

Catalysts prepared by the above recited technique exhibit an ability to produce at maximum oil production conditions yields of 370° C.+ dewaxed oil of 50% or more from a 600N slack wax feed (20% oil in wax). Dewaxed oil is defined as that part of the total isomerate product which boils above about 370° C. and which is not wax, as measured by the ASTM D3235 procedure for determining oil content. The oil produced by isomerization of slack wax using this catalyst has a VI of at least 130.

This catalyst is used to isomerize waxes from any source including slack waxes obtained from the dewaxing of conventional petroleum hydrocarbons and synthetic waxes, as obtained by Fischer-Tropsch synthesis.

Slack waxes may contain from 0 to 50% oil or more. Preferably the slack wax should have its oil content in the range 1–35% oil, preferably 1–20% oil.

The wax feed is converted to an isomerate base oil using 2 (optionally 3) catalytic steps and 2 separation steps:

In general the isomerization involves the steps of
(1) hydrotreating the wax, if necessary, to remove heteroatom and poly nuclear aromatic contaminants,
(2) passing the hydrotreated wax to the isomerization unit,
(3) fractionating the isomerates into a fuels fraction and a lubes fraction,
(4) solvent dewaxing the lubes fraction,
(5) separating the crystallized wax from the oil, and
(6) recycling the recovered wax and optionally any fractionator bottoms to the isomerization process.

The recovered wax and fractionator bottoms can be recycled either directly to the isomerization unit or they can be recycled to the wax feed for passage through the hydrotreater as in Step (1) above.

In the above processing scheme the total liquid product from the isomerization unit (prior to fractionation) can be subjected to a hydrofinishing step under mild conditions using the same isomerization catalyst or simply a noble Group VIII on alumina catalyst. This is described in further detail below.

Since isomerization to oil is never 100% selective, lower valued coproduced fuels are separated from the lube fraction and unreacted waxes are separated from the lube fraction by solvent dewaxing, said unreacted waxes being recycled to the isomerization reactor.

Since slack waxes are obtained from natural petroleum sources they can contain significant quantities of heteroatom and poly-nuclear aromatic compounds which are detrimental to the isomerization catalysts. Consequently the slack waxes should be hydrotreated prior to introduction into the isomerization reactor Hydrotreating can be performed over any of the conventional hydrotreating catalysts such as Ni/Mo on alumina, Co/Mo on alumina, Ni/Co/Mo on alumina (e.g. KF840, HDN 30, etc.) under fairly standard hydrotreating conditions, e.g. temperatures in the range of 320–400° C., preferably 350–380° C., pressures in the range 1000–3000 psig, preferably 1000–1500 psig, hydrogen gas rates of 500–4000 SCF/bbl, preferably about 1500 SCF/bbl and space velocities of about 0.1 to 10 v/v/hr, preferably 0.2–1.0 v/v/hr.

Following any hydrotreating deemed necessary, the hydrotreated wax is introduced along with hydrogen into the isomerization reactor and contacted with the catalyst of the present invention.

It is taught in copending application, U.S. Ser. No. 283,664 filed even date herewith which is a continuation-in-part of U.S. Ser. No. 135,150, filed Dec. 18, 1987 in the names of Cody, Bell, West, Wachter, and Achia that the level of wax conversion which strikes the balance between these competing interests is that which leaves about 40% and less unconverted wax, preferably 15 to 35%, most preferably 20 to 30% unconverted wax calculated as (unconverted wax)/(unconverted wax +dewaxed oil) X100 in the fraction of the isomerate boiling in the lube boiling range sent to the dewaxer. At such levels of conversion the most efficient use of wax is made considering that unconverted wax recovered in the dewaxer is recycled to the isomerization unit.

As is also taught in U.S. Ser. No. 283,664 following isomerization the isomerate is fractionated into a lubes cut and a fuels cut, the lubes cut identified as that boiling in the 330° C.+ range, preferably the 370° C.+ range. This lubes fraction is then dewaxed. Dewaxing is preferably accomplished by techniques which recover unconverted wax.

Solvent dewaxing utilizes typical dewaxing solvents such as $C_3$-$C_6$ ketones (e.g. methyl ethyl ketone, methyl isobutyl ketone and mixtures thereof), aromatic hydrocarbons (e.g. toluene) mixtures of ketones and aromatics (e.g. MEK/toluene) and liquid, normally gaseous autorefrigerative solvents such as $C_2$-$C_4$ hydrocarbons (e.g. propane, butane etc.) etc. It is taught in U.S. Ser. No. 283,664 that the preferred solvent to dewax the isomerate under miscible conditions and thereby produce the highest yield of dewaxed oil at the highest filter rate is a mixture of MEK/MIBK (20/80 v/v) used at a temperature in the range −25−−30° C. Lower pour points can be achieved using lower temperatures and other ratios of solvent but a penalty is paid due to operation under immiscible conditions, the penalty being lower filter rates. Further, when dewaxing isomerate made from Bright Stock slack wax it has been found to be preferred that the fraction of the isomerate which is dewaxed is the "broad heart cut" identified as the fraction boiling between about 300 to 600° C., preferably 370-600° C.

One desiring to maximize the production of lube oil having a viscosity in the 5.6 to 5.9 cSt/100° C. range should practice the isomerization process under low hydrogen treat gas rate conditions, treat gas rates on the order of 500 to 5000 SCF/bbl, $H_2$, preferably 2000 to 4000 SCF/bbl, $H_2$, most preferably about 2000 to 3000 SCF/bbl, $H_2$, as is taught in copending application U.S. Ser. No. 283,684 filed even date herewith which is a continuation-in-part of U.S. Ser. No. 134,998 filed Dec. 18, 1987 in the name of H. A. Boucher.

It has also been found that prior to fractionation of the isomerate into various cuts and dewaxing said cuts, the total liquid product (TLP) from the isomerization unit can be advantageously treated in a second stage at mild conditions using an isomerization catalyst or simply a noble Group VIII on alumina catalyst to reduce PNA and other contaminants in the isomerate and thus yield an oil of improved daylight stability. This aspect is covered in application U.S. Ser. No. 283,659, filed even date herewith which is a continuation-in-part of Cody, Macdonald, Eadie and Hamner, U.S. Ser. No. 135,149 filed Dec. 18, 1987.

In that embodiment the Total Liquid Product (TLP) is passed over a charge of isomerization catalyst or over a noble Group VIII on alumina catalyst under mild conditions, e.g., a temperature in the range of about 170° -270° C., preferably about 180° to 220° C. at a pressure of about 300–1500 psi $H_2$, preferably about 500 to 1000 psi $H_2$, a gas rate of about 500 to 10,000 SCF/bbl, preferably 1000 to 5000 SCF/bbl and a flow velocity of about 0.25 to 10 v/v/hr., preferably about 1-4 v/v/hr.

The TLP can be treated under these mild conditions in a separate, dedicated unit or the TLP from the isomerization reactor can be stored in tankage and subsequently passed through the same isomerization reactor under said mild conditions. It has been found to be unnecessary to fractionate the TLP prior to this mild second stage treatment. Subjecting the whole TLP to this mild second stage treatment produces an oil product which upon subsequent fractionation and dewaxing yields a base oil exhibiting a high level of daylight stability and oxidation stability. These base oils can be subjected to subsequent hydrofinishing under conventional conditions to remove undesirable process impurities.

In examples 2 to 5 of the present text the performance of wax isomerization catalysts are correlated with catalyst properties. In some cases catalysts were prepared by a catalyst manufacturer according to our procedures but full details of their preparation are unavailable.

Significant differences in catalyst performance were noted which relate to differences in composition, in particular the fluoride concentration at the surface of the catalyst particle.

Separate studies have revealed the criticalities in preparation that affect the fluorine distribution in the particle. Two key factors were identified; the pH of the fluoriding medium and the heat-up conditions.

These factors are illustrated in Example 1 and FIG. 1.

EXAMPLE 1

Four catalysts were prepared to determine the effects of the pH of the fluoriding media and calcination conditions upon the fluoride distribution. In each case 300 gm of calcined 0.6% Pt $\gamma$ $Al_2O_3$ on was contacted with an aqueous fluorine containing solution to deliver about 7 wt% F. in each case.

Catalyst I was contacted with an aqueous solution made up of 78.4 gm of 48% HF solution in 253 cc of deionized water providing a pH of 2.5.

Catalyst II was contacted with an aqueous solution made up of 63.6 gm of 48% HF solution and 13.2 gm of $NH_4F$ dissolved in 228 cc of deionized water providing a pH of 3.2.

Catalyst III was contacted with an aqueous solution made up of 54.8 gm of 48% HF solution and 21.0 gm of $NH_4F$ dissolved in deionized water to provide 324 cc of solution having a pH of 4.2.

Catalyst IV was contacted with an aqueous solution made up of 39.2 gm of 48% HF solution and 35.0 gm of $NH_4F$ dissolved in deionized water to provide 324 cc of solution with a pH of 5.3.

Each catalyst was soaked in their respective solutions overnight (sufficient to deliver ∼ 7 wt% F to the catalyst), followed by decanting and washing three times with 1000 cc of deionized water. Samples of each catalyst were dried in air in the following manner: Calcination Conditions In each case the catalysts were heated in a muffle furnace in air, reaching a final temperature of 400° C. However, the rate of heat-up to 400° C. was varied.

Slow heat-up rate (5 hours to reach 400)

Heat from ambient to 150 C over ~ 2 hour period at a rate of increase of 6° C. every 5 minutes, then over next 2 hour period raise the temperature to 300° C. at a rate of increase of 13 C every 10 minutes. Finally heat for about one more hour at a rate of 19° C. increments over 15 minute intervals until reaching 400° C. Hold at 400° C. for 1 hour.

Fast heat-up rate (20 minutes to reach 400° C.)

Heat from ambient to 400° C. in 20 minutes then hold for 1 hour.

Each catalyst was then analyzed by electron microprobe to determine the distribution of fluorine through the catalyst particle. These profiles are shown in FIG. 1.

In each profile, 'E' designates the edges of the circular cross-section of 1/16"extrudate. Profiles were analyzed for several particles from each batch of catalyst and those shown in FIG. 1 are the most representative. Some trends are evident. At pH 3.2 and below, fluorine is concentrated in the center of the particle, but at the very edge and into about ¼ of the distance to the center (i.e. about 1/100") the concentration is low. At these low pH,s the calcination rate appears to have no influence on distribution.

At pH 5.3 the fluoride distribution is markedly affected by the calcination rate. If calcination is fast, the edge concentration and the bulk concentration are equivalent, i.e. fluorine is distributed evenly. But if the calcination rate is slow, fluorine becomes highly concentrated at the outermost edge of the particle. In neither case is an acceptable fluorine distribution obtained.

At pH 4.2 the fluorine distribution is also affected by the calcination rate. Relatively low concentrations of fluorine are achieved at the edge of the particle if the calcination rate is fast whereas high levels at the outermost edge are achieved at a slow rate of calcination.

In summary the desired effect of producing a low concentration of fluorine at the edge of a particle comprising nominal bulk fluorine levels of around 7 wt% is achieved by either
° (a) keeping pH below 3.5 or
(b) if pH in the range 3.5 to 4.5, using a rapid rate of calcination.

Low levels of fluorine cannot be readily achieved even at fast calcination rates if the pH used exceeds pH=4.5.

EXAMPLE 2 Catalysts 1A, 1B, 1C and 1D

This example illustrates how activity and selectivity change as a function of fluorine content. NH₄F solution (pH 7.5) was used as the fluoriding media to insure that fluorine was distributed evenly. The catalysts were also calcined in a manner which preserved a flat distribution. Consequently, in these catalysts the edge level fluorine and the bulk level fluorine are equivalent so that the effects of fluorine content can be assessed in the absence of any fluorine distribution effect.

A series of catalysts (Catalysts 1A, 1B, 1C and 1D) was prepared using NH₄F as the fluoriding source. The catalyst was 1/16"extrudates which, as obtained from the manufacturer contained 0.3 wt% platinum and 1% chlorine on alumina. 100 gram samples of this material were treated with 55 ml of aqueous solutions containing NH₄F by dropwise addition and stirring. This volume of solution was just sufficient to wet the entire 100 grams of catalyst. The four 55 ml solutions contained, respectively 2.1, 4.2, 8.4 and 13.3 grams of NH₄F so that the solutions would deposit between 0.75 to 4.5 wt% fluorine onto the catalysts. The wetted extrudates were left for 1 hour at room temperature and then dried at 120.C. for 1 hour, then calcined in an air flow at the following conditions; hold at 150° C. for 1 hour, raise temperature by 50° C. every 15 minutes to 400° C. then hold at 400° C. for 2 hours.

A hundred cc of these catalysts were charged to a fixed bed reactor and activated in the following way:
1. Heat from room temperature to 100° C. in H₂ at 50 psi, 3 cu ft/hr over a 2 hour period.
2. Hold at 100° C. for 1 hour.
3. Raise temperature to 350° C. over a 2 hour period.
4. Hold at 350° C. for 1 hour.
5. Cool to below 300° C., adjust pressure, gas rate and cut in feed wax.

These catalysts were evaluated for conversion of slack wax obtained from 600N oil which wax was hydrotreated over KF-840 catalyst prior to isomerization and contained about 22% oil, sulfur less than 5 ppm and nitrogen less than 1 ppm. Conditions used in the hydrotreating step were: 330° C., 0.5 v/v/hr, 1000 ps: H₂ and 1500 SCF/bbl, H₂.

Isomerization was conducted under a range of temperatures to convert the wax to oil. Table 1 shows the set of isomerization conditions which produced the maximum yields of oil boiling in the 370° C.+ range. These yields were obtained using a modified ASTM D3235 oil content method using 100% MIBK at −35° C. filter temperature. Oil content is predicted to be about 3% higher if one used the AST D3235 method (the basis on which all other oil yields in this case were determined).

TABLE 1

NH₄F Treated Pt/Al₂O₃ Catalyst (0.3% Pt)
(1/16" extrudates)
Feed: Hydrotreated 600N Slack Wax (22% Oil)

| Catalyst | 1A | 1B | 1C | 1D |
|---|---|---|---|---|
| Nominal % F | 0.75 | 1.5 | 3.0 | 4.5 |
| N/Al by XPS | — | 0.0008 | 0.0009 | 0.0014 |
| Isomerization Conditions | | | | |
| Temp., °C. | 331 | 332 | 296 | 288 |
| Press, psi H₂ | 1000 | 1000 | 1000 | 1000 |
| Gas rate, SCF/B, H₂ | 5000 | 5000 | 5000 | 5000 |
| LHSV, v/v/hr | 0.9 | 0.9 | 0.9 | 0.9 |
| Max 370° C.+ dewaxed oil, wt % on feed | 49.5 | 44.5 | 42.5 | 42.8 |
| 370° C.− (wt % on feed) | 34.4 | 28.1 | 28.5 | 17.7 |
| k330c (40 hrs)* | 1.0 | 0.9 | 19.0 | 34 |

*The activity of the catalyst is expressed in terms of wax disappearance at 330° C. assuming first order kinetics and an energy of activation of 65 KCal/−mole. The rate constant k330° C. applies to an operation at 1000 psi H₂ and a gas rate of 5000 SCF/B.

Figure 2:
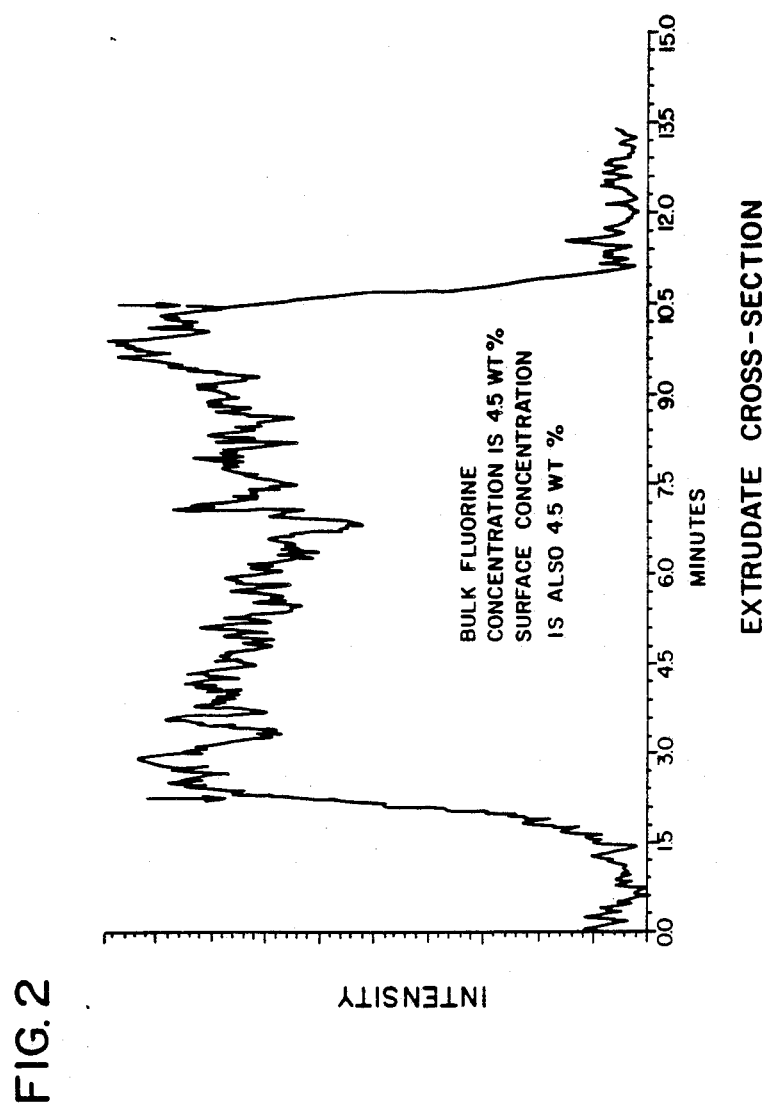
FIG. 2 presents the fluorine distribution obtained by election microprobe through catalyst particles made using $NH_4F$ (pH 7.5) and shows that using $NH_4F$ as the fluorine source produces catalysts possessing an even (uniform) fluorine distributions. That is, bulk fluorine levels are the same as surface fluorine levels. This is not a catalyst of the invention.

FIG. 2 is presented to show that catalysts prepared in the present Example as exemplified by Catalyst 1D, do have a uniform distribution of fluorine. That is, surface fluorine and bulk fluorine content were the same. Review of the data in Table 1 shows that conversion of wax into 370° C.+ oil increases as the amount of fluorine decreases but that simultaneously the activity decreases. Conversely, higher levels of activity exhibit reduced levels of selectivity. Thus, catalysts having a higher fluorine loading are seen to exhibit a higher level of activity, but selectively to oil boiling in the 370° C.+ range is lower.

EXAMPLE 3-Catalysts of the Present Invention Catalysts 2 and 3

Catalysts exhibiting both high selectivity and high activity were prepared using a solution of NH$_4$F/HF at pH 4. The catalysts were prepared by fluoriding 1/16 inch $\gamma$ alumina extrudates which as received from the manufacturers contained 0.6 wt% platinum and about 1 wt% chlorine. The catalysts were dried, heated in air and activated in hydrogen as recited in Table 2.

In these runs the wax used is a 600N slack wax obtained by solvent dewaxing a 600N oil. The slack wax was hydrotreated over HDN-30 catalyst at 350° C., 1.0 V/V/Hr, 1500 SCF/bbl, 1000 psi H$_2$ or over KF-840 at 340° C., 0.5 V/V/Hr, 1000 psi and 1500 SCF/bbl, H$_2$. Hydrotreated wax recovery was on the order of 98%. These hydrotreated waxes had oil contents ranging from 21 to 23%, sulfur ranging from 3 to 10 ppm and nitrogen $\leq 1$ ppm. Following isomerization on a once through pass mode of operation (upflow) the isomerate was fractionated into a 370° C.+ cut (lube fraction) which was dewaxed at a filter temperature of $-32°$ C. using 50/50 mixture of MEK/Toluene (ASTM Test D3235). The results of isomerization using the various catalysts are reported below.

TABLE 2

| NH$_4$F/HF Treated Catalysts of the Invention | | |
|---|---|---|
| Catalyst | 2 | 3 |
| Charge, cc | 50 | 200 |
| F Treat | NH$_4$F/HF | NH$_4$F/HF |
| Calcination, °C. | 400 (muffle) | 400 (rotary kiln) |
| N/Al by XPS | 0.0037 | 0.0021 |
| Hydrate Level | 29 | 24 |
| F, wt % (bulk) | 6.9 | 7.0 |
| F, wt % (surface) | 1.7 | 2.0 |
| Activation Times, hr. | | |
| RT to final temp. (T) | 7 | 7 |
| Time at T | 2 | 2 |
| T, °C. | 343 | 350 |
| Activation pressure H$_2$ | ambient | 50 psi |
| Isomerization Conditions | | |
| Temp. °C. | 310 | 309 |
| LHSV (v/v/h) | 0.45 | 1.0 |
| Press. psi H$_2$ | 1000 | 1000 |
| Gas rate (SCF/B, H$_2$) | 5000 | 5000 |
| k(330° C.) at | | |
| 50 hrs | 45 | 2.0 |
| 100 hrs | — | 7.4 |
| 300 hrs | 1.9 | — |
| 500 hrs | 4.7 | — |
| Max 370° C.+ oil yield (wt. % on feed)[2] | 50[1] | 49.3 |
| 370° C.− (wt % on feed) | 28 | 35.2 |

[1]interpolated data
[2]by ASTM D3235 method

Figure 3:
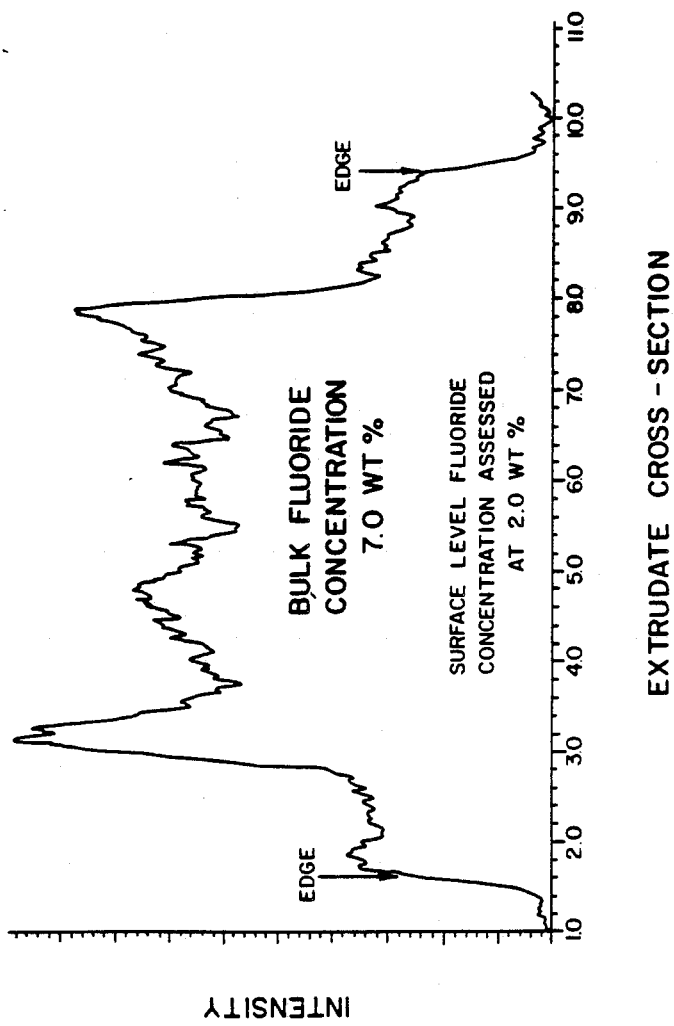
FIG. 3 presents the fluorine distribution obtained by electron microprobe in a catalyst made using $NH_4F/HF$ pH 4. Lower fluorine levels at the particle surface are illustrated.

FIG. 3 shows that the fluorine distribution in a sample of catalyst 3 is uneven, containing more fluorine in the center of the particle and less fluorine in the region extending from the outer surface to about 1/100 of an inch in from the surface. Catalyst 2 has been found to have a similar uneven distribution. From the data presented in the example it is apparent that catalysts possessing this uneven fluorine distribution exhibit both high activity and selectivity and are therefore unexpectedly superior catalysts.

EXAMPLE 4-Comparative Examples

Catalysts 4, 5, 6 and 7

Catalysts were prepared as in Example 2 using the same platinum loaded 1/16" commercial extrudate and fluoriding using NH$_4$F/HF. These catalysts were dried, heated in air and then activated in hydrogen as recited in Table 3.

TABLE 3

| Comparative Catalysts Made from NH$_4$F/HF Treatment | | | | |
|---|---|---|---|---|
| Catalyst | 4 | 5 | 6 | 7 |
| Charge (cc) | 200 | 200 | 200 (trilobe) | 200 |
| F. Treat | NH$_4$F/HF | NH$_4$F/HF | NH$_4$F/HF | NH$_4$F/HF |
| Calcination °C. | 400 (muffle) | 400 (rotary kiln) | 400 (muffle) | 400 (rotary kiln) |
| N/AL by XPS | 0.0040 | 0.010 | 0.013 | 0.0021 |
| Hydrate Level | <10 | 39 | <10 | 24 |
| F, wt % | 6.9 | 6.8 | 5.6 | 7.0 |
| F, wt % (surface) | ~7 | ~10 | ~5 | * |
| Activation Times, hr., Rt to 100° C. | 2 | 2 | 2 | 3 |
| Time @ 100C, | 1 | 1 | 1 | 6 |
| 100° C. to final temp (T) | 2 | 2 | 2 | 42 |
| Time at T | 1 | 1 | 1 | 3 |
| T, °C. | 350 | 350 | 350 | 400 |
| Final Activation Pressure psi H$_2$ | 50 | 50 | 50 | 300 |
| Isomerization Conditions | | | | |
| Temp., °C. | 310 | 310 | 300 | 305 |
| LHSV (v/v/h) | 0.90 | 0.90 | 0.90 | 1.0 |
| Pressure psi H$_2$ | 1000 | 1000 | 1000 | 1000 |
| Gas Rate (SCF/B, H$_2$) | 5000 | 5000 | 5000 | 5000 |
| Max 370° C.+ oil yield (wt. % on feed)** | 48.5 | 44.0 | 45.0 | 45.0 |
| 370° C.− wt. % | 30.1 | 26.1 | 24.1 | 21.8 |

TABLE 3-continued

| | Comparative Catalysts Made from NH$_4$F/HF Treatment | | | |
|---|---|---|---|---|
| Catalyst | 4 | 5 | 6 | 7 |
| Wax remaining wt % | 21.4 | 29.9 | 30.9 | 33.2 |
| Activity k(330° C.) at | | | | |
| 50 hrs | 100 | 20 | 17 | 105 |
| 100 hrs | 19.9 | 13 | 13.0 | 25 |
| 300 hrs | 5.5 | 8.3 | — | 11.6 |
| 500 hrs | 2.5 | 5.5 | — | 8.5 |

*Fluorine at surface measures about 2.0 before activation and approximately 7 after activation.
**oil yields determined by ASTM D-3235.

Figure 4:
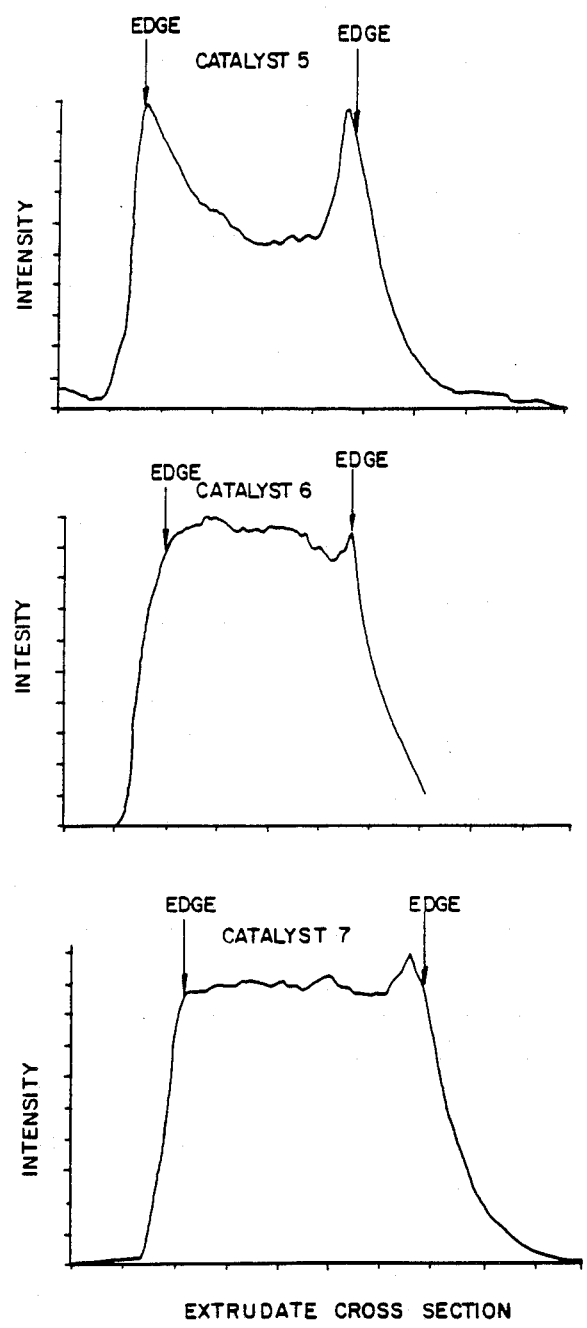
FIG. 4 shows that for catalysts 5, 6 and 7 the fluorine distribution (by electron microprobe) is flat (bulk fluorine equal to surface fluorine). These are not catalysts of the invention.

FIG. 4 is presented to show the fluorine distribution for fresh, air heated catalysts 5 and 6 and the discharged catalyst 7. It is seen that for catalysts 5 the fluorine distribution is concentrated at the edge while for catalyst 6 the fluorine distribution is flat. We would expect them to exhibit low selectivity, similar to that of catalyst ID of Example 1, which is indeed the case. Thus, the lower selectivity of catalysts 4, 5 and 6 is attributed to improper control of pH and/or improper heat-up procedures that lead to high levels of fluorine at the surface. In the case of catalyst 7, the excessively severe activation conditions employed subsequently increased the edge fluorine level of the catalyst (i.e., the edge and bulk levels are about the same). This we believe is the reason for its poorer selectivity.

EXAMPLE 5

Catalysts 8. 9. 10 and 11

This example demonstrates that catalysts prepared at pH less than 3.5 which have the desired low surface fluorine content, may still have poor selectivity unless they are heated at high enough temperatures to lower the hydrate content to acceptably low levels as determined by XRD.

Figure 5:
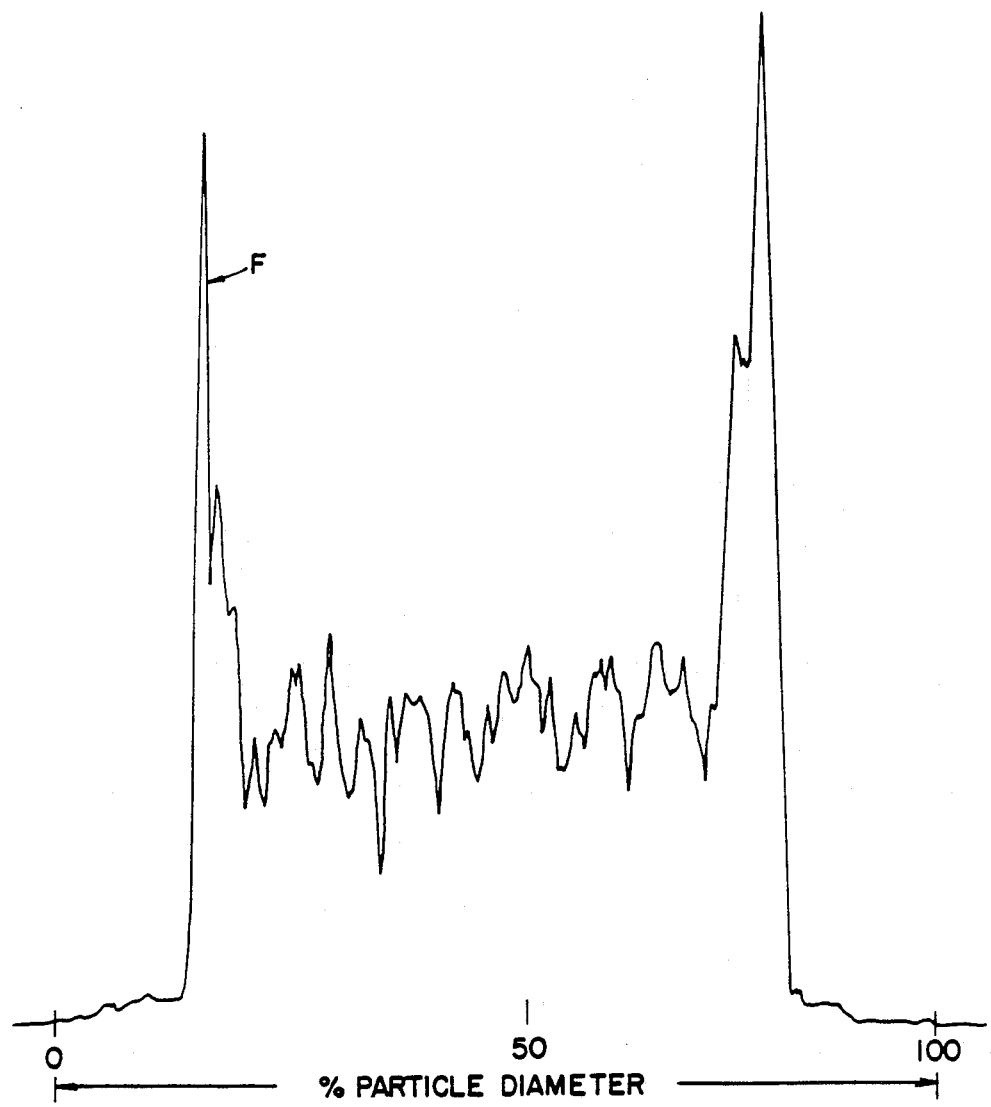
FIG. 5 shows a catalyst fluorided using aqueous HF solution, showing (by electron microprobe) lower levels of fluorine at the particle surface.

FIG. 5 shows the fluorine distribution in a catalyst prepared using the HF fluoriding technique (Catalyst 8). It is seen that the fluorine distribution is uneven, giving rise to a material which one would expect to exhibit high activity associated with high bulk fluorine levels and the high selectivity associated with low surface fluorine concentrations. However, as shown below, these catalysts have the additional requirement that they be sufficiently heated to reduce the initially high level of hydrate before good selectivity can be achieved.

Figure 6A:
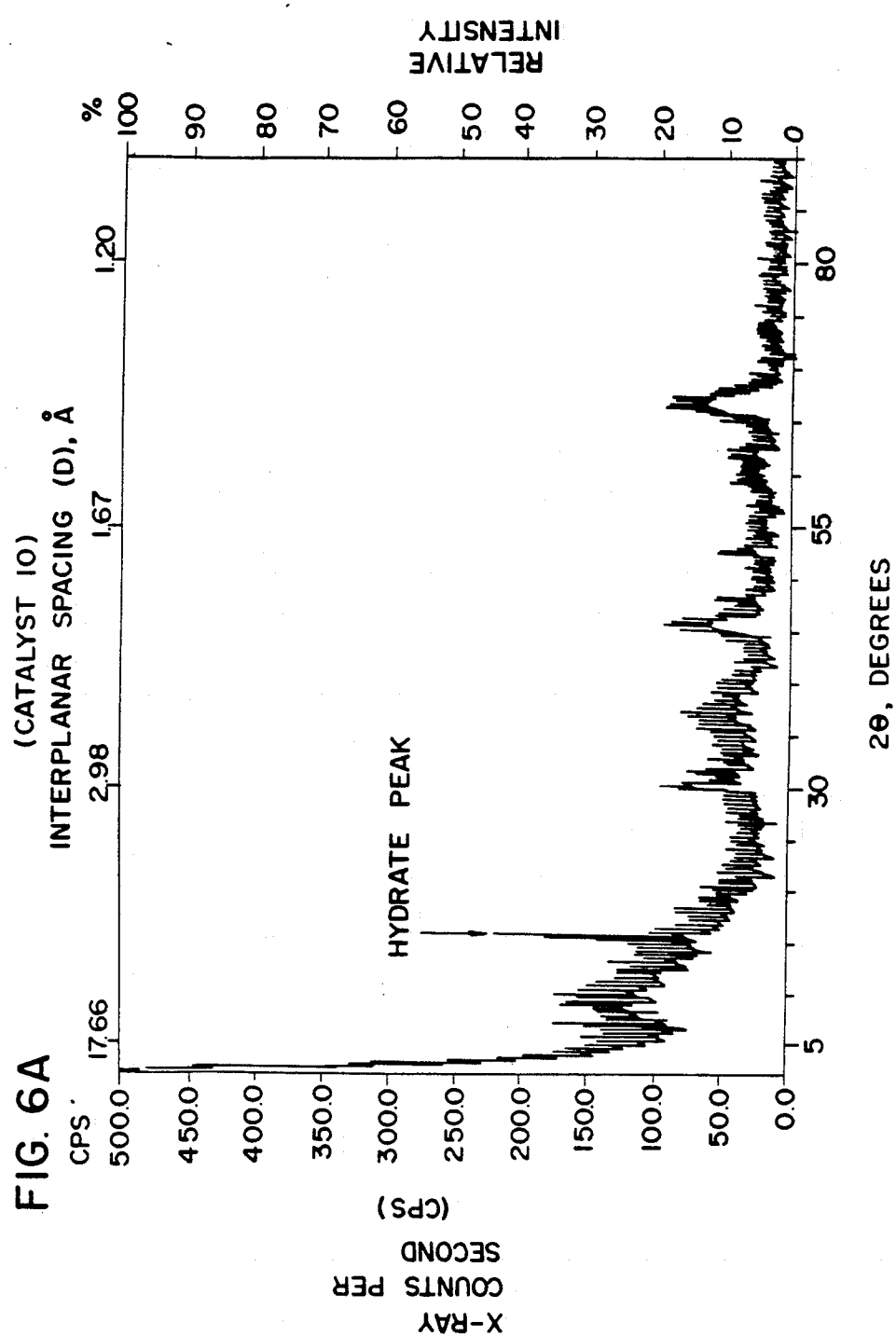
FIG. 6 (A-D) show the aluminum fluoride hydroxide hydrate level, by X-ray, for catalysts made using the following aqueous fluoride sources: HF (pH 2.5) (followed by drying only, catalyst 10); HF (pH 2.5) (followed by drying and heating, catalyst 9); $NH_4F$ (pH 7.5) (followed by heating, catalyst 1A); $NH_4F/HF$ (pH ~4) (followed by heating, catalyst 3).
Figure 6B:
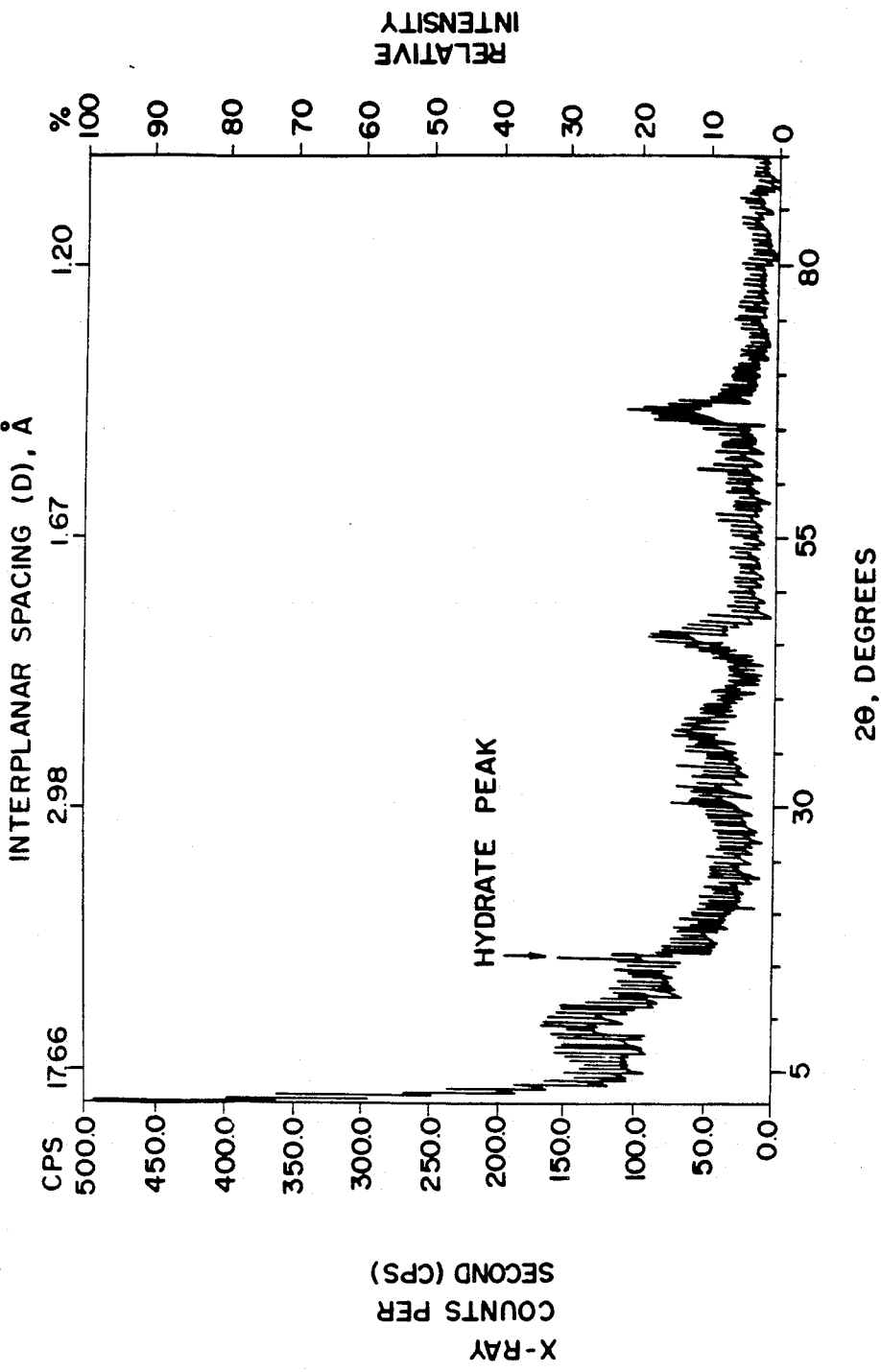
Figure 6C:
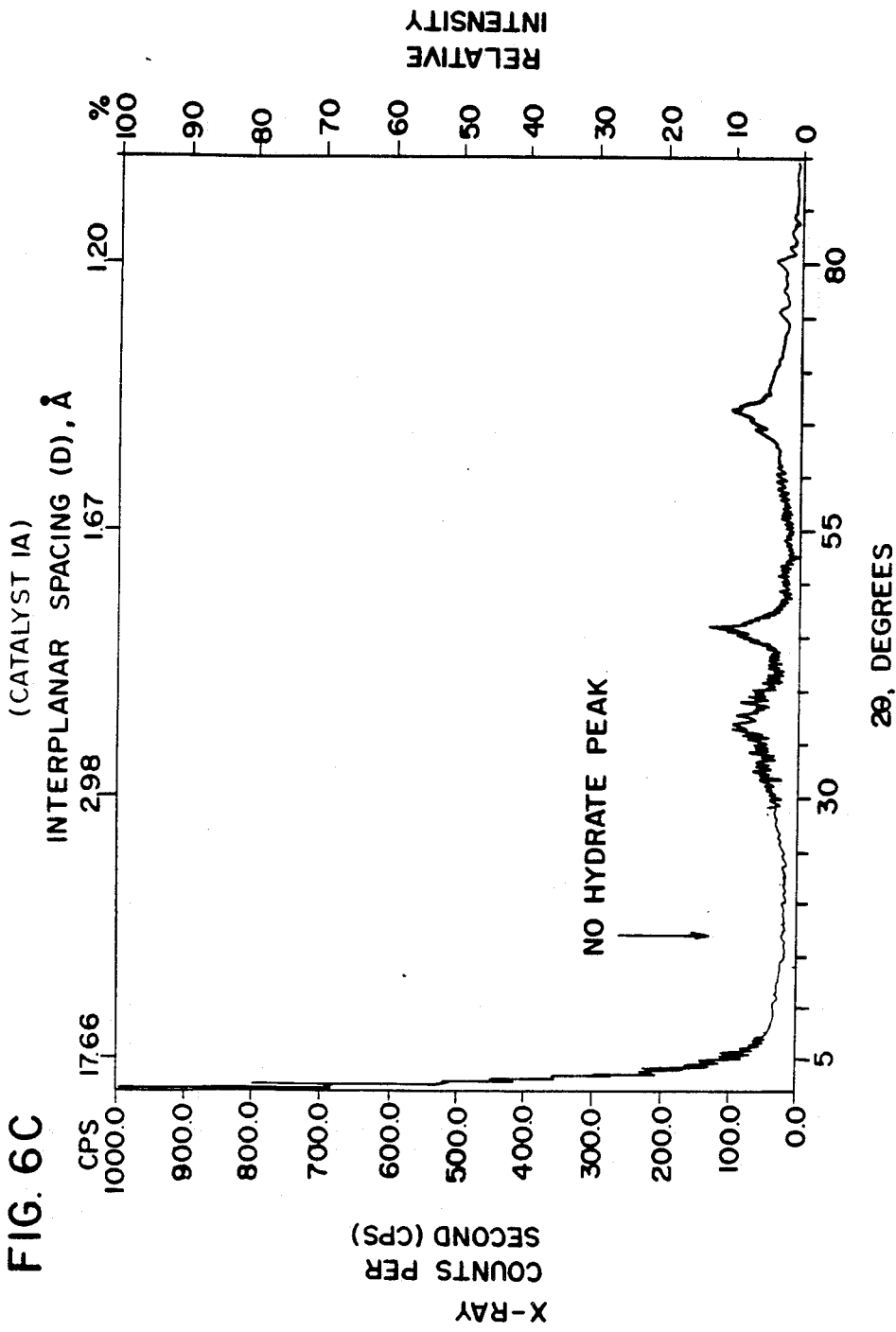

FIG. 6 (a–d) presents the X-ray analysis of four catalysts: Catalyst 10 made employing HF solution then dried only; Catalyst 9 made employing HF solution then heated in air at ~400° C.; Catalyst 1A made employing NH$_4$F then heated in air at ~400° C.; Catalyst 3 made employing NH$_4$F/HF then heated in air at ~400° C. It is seen that the catalyst which exhibits good selectivity has a hydrate peak height below 60% of the standard Catalyst 8.

In the following runs the isomerate was made from slack wax obtained by solvent dewaxing a 600N oil. The slack wax was hydrotreated over HDN-30 catalyst at 350° C., 1.0 V/V/hr., 1,500 SCF/bbl, H$_2$, 1,000 psi H$_2$, or over KF-840 at 340° C., 0.5 V/V/hr, 1,000 psi, 1,500 SCF/bb1, H$_2$.98 percent wax was recovered. These hydrotreated waxes had oil contents ranging from 21 to 23 percent S ranging from 3 to 10 (ppm), N$\leq$1 (ppm).

This wax feed was contacted with platinum on fluorided alumina catalysts produced in the following way:

Catalyst 8

One sixteenth inch γ alumina extrudates impregnated with platinum were obtained from the commercial supplier containing 0.6 weight percent platinum and 1 percent chlorine on the extrudates. It is believed this metal loaded extrudate was calcined by the manufacturer. The metal loaded extrudate was then fluorided using 5:1 volume excess of 11.6 wt % aqueous HF by immersion for 6 hours at ambient temperature (about 25° C.). The resulting catalyst was washed with 2-fold excess H$_2$0 and dried at about 150° C. for 16 hrs. The catalyst was activated in atmospheric pressure H$_2$ as follows: heating from room temperature to 343° C. in 4 hours, hold at 343° C. for 2 hours.

Catalyst 9

This catalyst was prepared using 1/16 inch γ lumina extrudates impregnated with platinum obtained from a commercial supplier. The extrudates contained 0.6 wt% platinum and 1% chlorine. The extrudates are believed to have been calcined by the manufacturer. The metal loaded extrudate was fluorided using 5:1 volume excess of 11.6 wt% aqueous HF by immersion for 6 hrs at about 25° C. The resulting material was washed with a 2-fold excess H$_2$0 and dried at about 150° C. for 16 hrs after which it was heated at 400° C. in air for 3 yours. The heated material was charged to a small pilot unit and activated in atmospheric pressure flowing H$_2$ by heating from room temperature to 343° C. in 4 hrs, and holding at 343° C. for 2 hrs.

Catalyst 10

This Catalyst was prepared using 1/16 inch γ extrudates impregnated with platinum as obtained from a commercial supplier. The extrudates contained 0.6 wt% platinum and 1% chlorine. The metal loaded extrudates were fluorided using aqueous HF (10 fold excess of 10% HF for 16 hours at ambient conditions followed by water washing and drying at 150° C. for 2 hrs). The catalyst had a fluorine content of 8.3 wt%. The catalyst was not calcined but was activated by heating from room temperature to 100° C. in 2 hrs, heating to 450° C. in 3 hrs with a hold at 450° C. for 1 hour. Activation was in flowing H$_2$ at 0 psi.

Catalyst 11

One sixteenth inch γ alumina extrudates impregnated with platinum were obtained from the commercial supplier containing 0.6 wt% platinum and 1% chlorine on the extrudate. The metal loaded extrudate was then fluorided using a 10 fold excess 10% aqueous HF by immersion for 16 hrs. at ambient temperature. The resulting catalyst was washed with 2 fold excess H$_2$0 and dried at 150° C. in vacuum for 16 hrs. The fluoride content was 8.0 wt%. The catalyst was activated in 300 psi $H_2$ at 6.3 SCF $H_2$/hr as follows: heat from room temperature to 100° C. at 35° C./hr; hold at 100° C. for 6 hrs; heat from 100° C. to 250° C. at 10° C./hr; hold at 250° C. for 12 hours; heat to 400° C. at 10° C./hr; hold at 400° C. for 3 hrs.

TABLE 4

| Catalyst | 8 | 9 | 10 | 11 |
|---|---|---|---|---|
| N/Al by XPS* | 0.0012 | 0.0013 | 0.0020 | — |
| Hydrate Level* | 100 | 60 | 100 | (100) |
| Hydrate Level (after activation) | 66 | 57 | (>60)² | (>60) |
| Fluoride wt % (bulk) | 7.2 | 7.2 | 8.3 | 8.0 |
| Fluorine wt % (surface) | 0.43 | (—)³ | — | — |
| Cat Charge (cc) | 50 | 50 | 100 | 200 |
| Flow | Up | Up | Up | Up |
| Isom Conditions | | | | |
| Temperature °C. | 313 | 315 | 330 | 318 |
| Pressure psi $H_2$ | 1000 | 995 | 1000 | 1000 |
| LHSV (v/v/h) | 0.45 | 0.45 | 0.90 | 1.0 |
| Gas Rate (SCF/bbl, $H_2$) | 5000 | 5000 | 5000 | 5000 |
| Max 370° C.+ oil yield (wt % on feed) | 47.1 | 51.7 | 45.6 | 45.0 |
| 370° C.− wt % | 36.1 | 18.7 | 20.4 | 29.0 |
| Activity k(330° C.) at | | | | |
| 50 hrs | 7 | — | — | — |
| 100 hrs | — | — | — | 13.0 |
| 300 hrs | 2.0 | 2.9 | — | 6.8 |
| 600 hrs | 3.0 | 3.4 | — | — |
| 1000 hrs | — | — | 1.0 | — |

¹as charged to reactor
²Estimate, based on treatments of similar catalysts.
³It is believed that the surface fluorine contents of catalyst 9 is the same as for catalyst 8 as it has been found that heating in air normally has little effect on surface fluorine levels of catalysts prepared at low pH.

It is believed that for catalysts prepared using the HF procedure, in the absence of an air heating step, subsequent heating in hydrogen of the catalyst loaded to a reactor unit should be conducted at least 400° C. for times longer than 5 hours.

From all of the above it is clear that catalysts which exhibit both high activity and high selectivity possess hydrate levels of 60 or less (as defined herein) have bulk fluorine levels of between about 2 to 10 wt%, preferably about 3 to 8 wt%, have surface fluorine levels (as that term is defined herein) of less than 3 wt%, preferably less than 1 wt% most preferably less than 0.5wt% and N/Al ratio, as determined by XPS of about 0.01 or less, preferably about 0.007 or less.

What is claimed is:

1. A wax isomerization catalyst comprising a Group VIII hydrogenation metal component on a fluorided alumina or material containing alumina support, which catalyst is characterized by possessing a surface nitrogen content N/Al ratio as determined by X-ray photoelectron spectroscopy of about 0.01 N/Al or less, a bulk fluorine content of between about 2 to 10 wt%, a surface fluorine content, defined as the amount of fluorine present in the layer between the outer surface of the particle and extending about 1/100 of an inch in from the surface, of less than about 3 wt% provided that the surface fluoride concentration is less than the bulk fluoride concentration and an aluminum fluoride hydroxide hydrate peak height of 60 or less determined as the relative amount of hydrate represented by a peak in the X-ray diffraction (XRD) pattern at $2\theta = 5.66$ Å when a hydrate level of 100 corresponds to the XRD peak height exhibited by a standard material which standard material is a platinum on fluorided alumina containing 0.6 wt% Pt on 150 m²/g surface area alumina fluorided using an aqueous solution containing a high concentration of HF to deposit 7.2 wt% fluorine on catalyst and dried at 150° C. for 16 hrs.

2. The catalyst of claim 1 wherein the hydrate level is between 10 to 60 and the N/Al ratio by XPS is about 0.007 or less.

3. The catalyst of claim 1 or 2 wherein the Group VIII hydrogenation metal is a noble Group VIII metal.

4. The catalyst of claim 3 wherein the Group VIII hydrogenation metal is platinum.

5. The catalyst of claim 1 or 2 wherein the hydrogenation metal content is in the range 0.1 to 5 wt%.

6. The catalyst of claim 4 wherein the hydrogenation metal content is in the range 0.1 to 1.0 wt%.

7. The catalyst of claim 1 wherein the bulk fluorine content between about 5 to 8 wt%.

8. A method for producing a wax isomerization catalyst of claim 1 comprising a Group VIII hydrogenation metal component deposited on a fluorided refractory metal oxide support which method comprises depositing the hydrogenation metal on alumina or material containing alumina support, calcining said metal loaded support, fluoriding said metal loaded support using a fluorine source solution of pH 3.5 to 4.5 to a bulk fluorine level of about 8 wt% or less and heating said fluorided, metal loaded support from ambient to a temperature of up to 350° to 450° C. in air, oxygen containing atmosphere or inert gas within about 3 hours.

9. The method of claim 8 wherein the buffered fluorine source solution is an aqueous solution of $NH_4F$/HF.

10. The method of claim 8 or 9 wherein the final calcination temperature is between 375 to 400.C. and the catalyst is held at that temperature for from 1 to 5 hours.

11. The method of claim 8 or 9 wherein the hydrogenation metal is platinum and the refractory metal oxide is gamma or eta.

12. The method of claim 10 wherein the hydrogenation metal is platinum and the refractory metal oxide is gamma or eta alumina.

13. The method of claims 8 or 9 further containing the step of activating the heated catalyst by heating in a hydrogen containing atmosphere from 1 to 24 hours at a temperature of 350° to 450° C.

14. A method for producing a wax isomerization catalyst of claim 1 comprising a Group VIII hydrogenation metal component deposited on a fluorided alumina or material containing alumina support, which method comprises depositing the hydrogenation metal on the support, calcining said metal loaded support, fluoriding said metal loaded support using a fluoride solution having a pH of less than 3.5 to a bulk fluorine content of about 10 wt% or less and heating said fluorided, metal loaded support at a temperature between 350° to 450° C. in air, oxygen containing atmosphere, hydrogen or inert gas.

15. The method of claim 14 wherein the catalyst is heated at a temperature between 375–425.

16. The method of claim 15 wherein the hydrogenation metal is platinum and the refractory metal oxide is gamma or eta alumina.

17. The method of claim 15 or 16 further containing the step of activating the heated catalyst by heating in a hydrogen atmosphere to 350° to 500.C for from 1 to 48 hours or longer.

18. The method of claim 10 further containing the step of activating the heated catalyst by heating in a hydrogen containing atmosphere from 1 to 24 hours at a temperature of 350 to 450° C.

19. The method of claim 11 further containing the step of activating the heated catalyst by heating in a hydrogen containing atmosphere from 1 to 24 hours at a temperature of 350 to 450° C.

20. The method of claim 12 further containing the step of activating the heated catalyst by heating in a hydrogen containing atmosphere from 1 to 24 hours at a temperature of 350 to 450° C.

* * * * *